United States Patent
Winn (10) Patent No.: US 9,942,310 B1
(45) Date of Patent: Apr. 10, 2018

(54) LOAD BALANCED SYSTEM FOR A MULTI-USER CAX ENVIRONMENT

(71) Applicant: United Technologies Corporation, Hartford, CT (US)

(72) Inventor: Joshua Daniel Winn, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 345 days.

(21) Appl. No.: 14/609,746

(22) Filed: Jan. 30, 2015

Related U.S. Application Data (60) Provisional application No. 61/938,184, filed on Feb. 11, 2014.

(51) Int. Cl.
 *G06F 17/30* (2006.01)
 *H04L 29/08* (2006.01)

(52) U.S. Cl.
 CPC .... H04L 67/1002 (2013.01); G06F 17/30174 (2013.01)

(58) Field of Classification Search
 CPC ................................................ G06F 17/30174
 USPC ........................... 707/609; 703/1, 2; 709/204
 See application file for complete search history.

(56) References Cited

U.S. PATENT DOCUMENTS

| | | | |
|---|---|---|---|
| 6,341,291 B1 * | 1/2002 | Bentley | G06F 17/30126 707/203 |
| 8,229,715 B1 | 7/2012 | Teller et al. | |
| 2002/0035451 A1 * | 3/2002 | Rothermel | G06F 17/50 703/1 |
| 2003/0105816 A1 * | 6/2003 | Goswami | G06Q 10/10 709/204 |
| 2013/0144566 A1 | 6/2013 | De Biswas | |
| 2014/0149882 A1 | 5/2014 | Nysetvold et al. | |
| 2014/0222387 A1 | 8/2014 | Cannon et al. | |
| 2014/0222919 A1 | 8/2014 | Nysetvold et al. | |
| 2014/0236550 A1 * | 8/2014 | Nysetvold | G06F 17/50 703/2 |

OTHER PUBLICATIONS

Xu, Yue, A Flexible Context Architecture for a Multi-User GUI, Thesis, Dec. 2010, Department of Mechanical Engineering, Brigham Young University.

(Continued)

*Primary Examiner* — Chelcie Daye
(74) *Attorney, Agent, or Firm* — Carlson, Gaskey & Olds, P.C.

(57) ABSTRACT

A system for multi-user design includes a host computer having a memory and a processor. The host computer is configured to operate a multi-user CAx environment including a part file, a plurality of local computers in communication with the host computer, a plurality of data storage systems in communication with the host computer, and a load balancing module within the CAx environment. Each of the local computers includes a local CAx environment portion of the multi-user CAx environment. Each of the data storage systems includes at least a portion of the part file. The load balancing module is configured to cause the host computer to assign edits originating at one of the local computers to one of the plurality of data storage systems.

18 Claims, 5 Drawing Sheets

(56) References Cited

OTHER PUBLICATIONS

Red, Edward, David French, Ammon Hepworth, Greg Jensen, and Brett Stone, Multi-User Computer-Aided Design and Engineering Software Applications, Cloud-Based Design and Manufacturing (CBDM), Jan. 1, 2014, pp. 25-62, Springer International Publishing.
Red, Edward, Greg Jensen, Jordan Ryskamp, and Kenneth Mix, NXConnect: Multi-User CAx on a Commercial Engineering Software Application, Department of Mechanical Engineering, Brigham Young University. 2010 PACE Global Annual Forum.

* cited by examiner

FIG.5

LOAD BALANCED SYSTEM FOR A MULTI-USER CAX ENVIRONMENT

CROSS-REFERENCE TO RELATED APPLICATION

This application claims priority to U.S. Provisional Application No. 61/938,184 filed on Feb. 11, 2014.

BACKGROUND

This disclosure relates to computer-aided technologies (CAx), and more particularly, to visualization of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

In one exemplary embodiment a system for multi-user design includes a host computer including a memory and a processor, wherein the host computer is configured to operate a multi-user CAx environment including a part file, a plurality of local computers in communication with the host computer, each of the local computers including a local CAx environment portion of the multi-user CAx environment, a plurality of data storage systems in communication with the host computer, wherein each of the data storage systems includes at least a portion of the part file, and a load balancing module within the CAx environment wherein the load balancing module is configured to cause the host computer to assign edits originating at one of the local computers to one of the plurality of data storage systems.

In another exemplary embodiment of the above described system, the load balancing module is configured to cause the multi-user CAx environment to assign edits originating from a single local computer to a single data storage system.

In another exemplary embodiment of any of the above described systems, the load balancing module is further configured to cause each of the plurality of data storage systems to synchronize with each other of the data storage systems in response to a triggering condition.

In another exemplary embodiment of any of the above described systems, the triggering condition is an elapsed time since a previous synchronization.

In another exemplary embodiment of any of the above described systems, the triggering condition is an amount of edits stored to at least one data storage system in the plurality of data storage systems.

In another exemplary embodiment of any of the above described systems, the amount of edits stored to at least one data storage system is an amount of edits to a feature of the part file including a dependency.

In another exemplary embodiment of any of the above described systems, each of the data storage systems stores a complete copy of the part file.

In another exemplary embodiment of any of the above described systems, each of the data storage systems stores a partial copy of the part file.

Another exemplary embodiment of any of the above described systems further includes an index file stored in at least one of the host computer and the plurality of data storage systems, wherein the index file includes an index correlating each partial copy of the part file with one or more corresponding data storage devices.

In another exemplary embodiment of any of the above described systems, each partial copy of the part file is fully distinct from each other partial copy.

In another exemplary embodiment of any of the above described systems, at least two of the partial copies include shared information.

In another exemplary embodiment of any of the above described systems, each of the data storage systems is connected to each of the other data storage systems via a physical connection.

In another exemplary embodiment of any of the above described systems, each of the data storage systems is connected to each of the other data storage systems via a network connection.

An exemplary method for load balancing in a multi-user CAx environment includes assigning at least one data storage element in a plurality of data storage elements to each local computer of a plurality of local computers in a multi-user CAx environment such that the local computers are distributed across the plurality of data storage elements, and applying at least one edit originating from one of the local computers to an at least partial part file stored in the at least one data storage element assigned to the local computer, thereby distributing an application of edits to the part file across the plurality of data storage elements.

A further example of the above exemplary method includes synchronizing each of the data storage elements in the plurality of data storage elements with each other of the data storage elements in the plurality of data storage elements.

In a further example of any of the above exemplary methods, synchronizing data storage elements includes propagating edits to a part file received by at least one of the data storage elements to each other of the data storage elements.

In a further example of any of the above exemplary methods, synchronizing each of the data storage elements in the plurality of data storage elements with each other of the data storage elements in the plurality of data storage elements is performed in response to a triggering event.

In a further example of any of the above exemplary methods, the triggering event includes at least one of an elapsed time since a previous synchronization and a number of edits to the part file exceeding a predefined edit count.

A further example of any of the above exemplary method includes creating an index file correlating each data storage element in the plurality of data storage elements with a portion of a complete part file, such that each data storage element stores a distinct partial part file, and such that a combination of all partial part files forms the complete part file.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
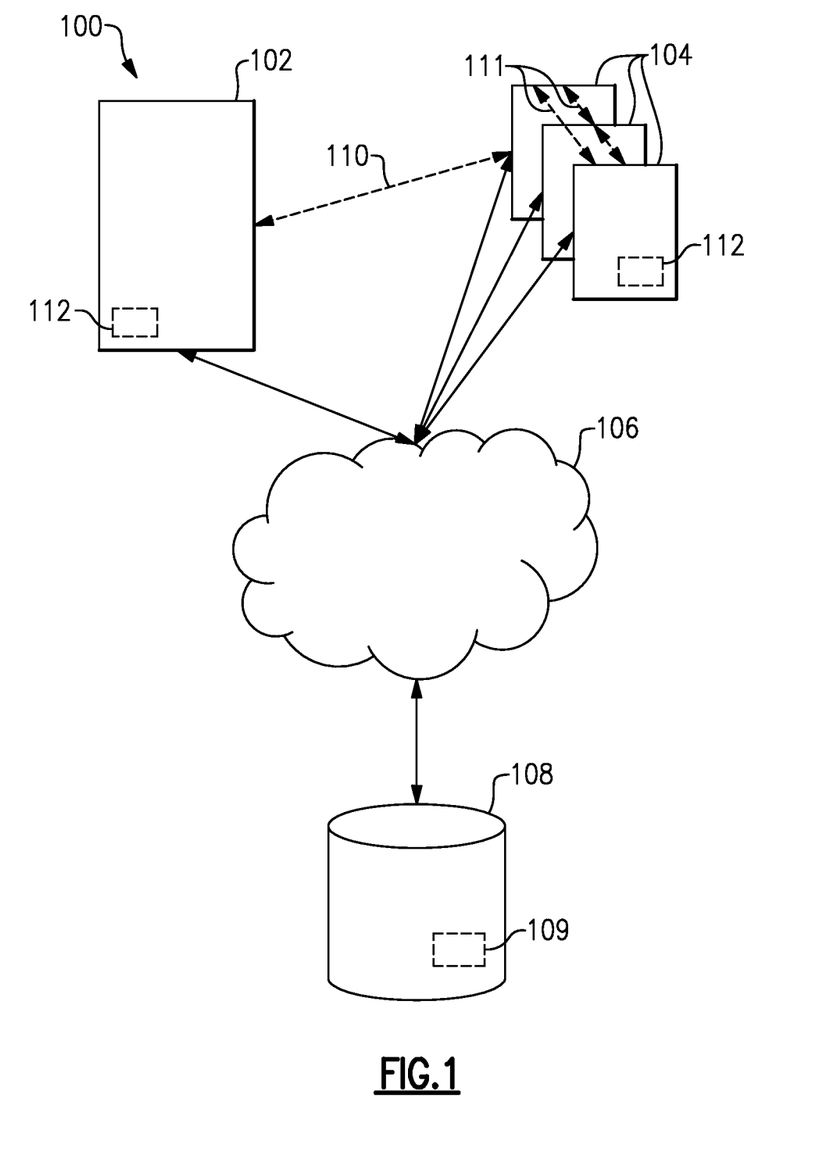
FIG. 1 illustrates a system for a multi-user CAx environment, according to an embodiment.

FIG. 1 illustrates an embodiment computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design.

The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, a relative or absolute spatial position or orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one custom layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to make modifications to various aspects of a component design corresponding to one or more part files. In some embodiments, the part file is stored locally at the storage system 108, with local copies of the part file at the client computers 104 being synchronized periodically. Modifications to each part file are communicated to each CAx environment currently accessing the part file, either in real-time or periodically utilizing a synchronization scheme. Display or visualization of the modification is therefore made substantially immediately available in CAx environments accessing the same part file, which can assist the multiple users in identifying conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for example. Accordingly, it may be desirable to limit the visualization of a particular aspect of a component design depending on the level(s) of access provided to a particular user profile. Each user profile corresponds to one or more access lists setting the level(s) of access for each user profile.

Figure 2A:
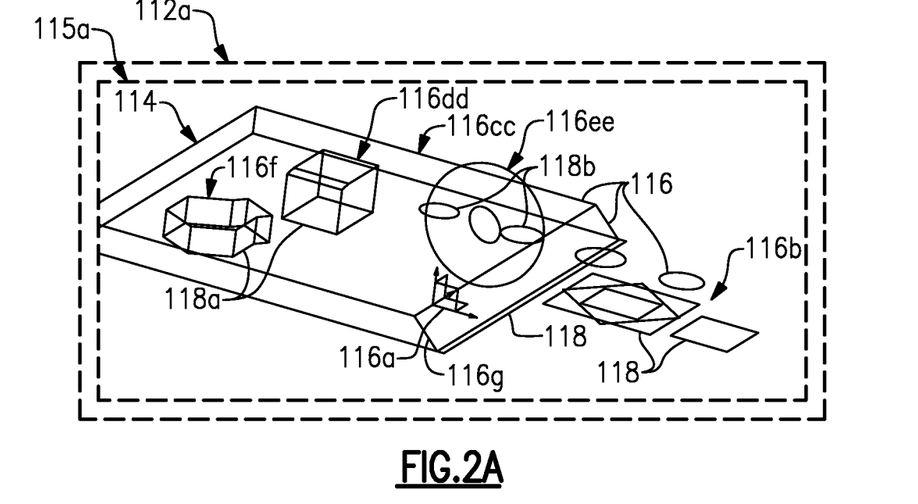
FIG. 2A illustrates a sample component design displayed in a first CAx environment, according to an embodiment.
Figure 2B:
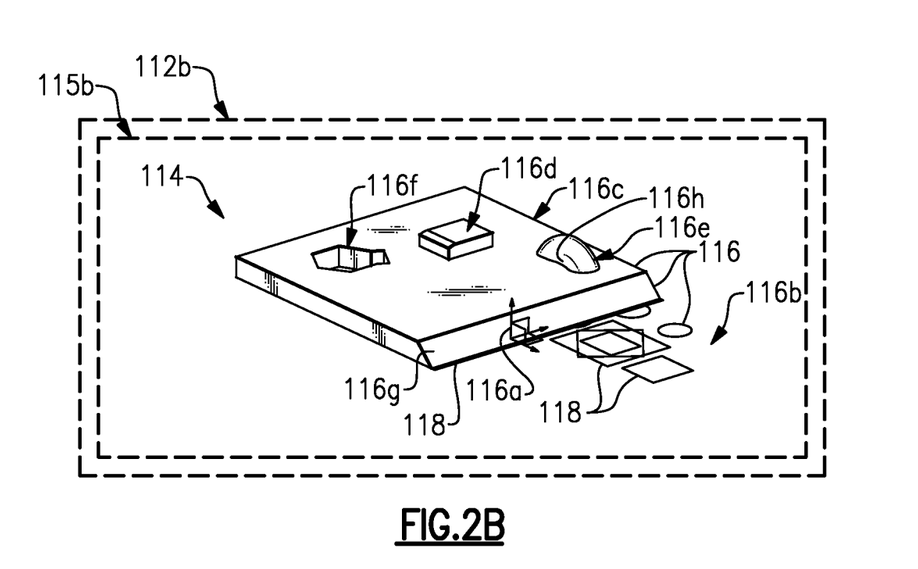
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The example component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

In some multi-user CAx systems 100, the quantity of simultaneous changes to a given part file can be significant. The number of simultaneous changes can increase due to the number of users concurrently working on the part file, the complexity of the operations being performed on the part file by multiple users, or any other similar factor or combination of factors. The number of the simultaneous changes is particularly high when multiple users are utilizing tools or features on their local computers 104, each of which make multiple changes in fast succession. Multiple simultaneous attempts by the local computers 104 to access the storage system 108 can bog down the storage system 108, creating an access bottleneck. The access bottleneck between the local computers 104, host computer 102 and the data storage element 108 can cause delays in storing data in the data storage element, and lead to system crashes or data losses. Furthermore, some exemplary multi-user CAx systems store multiple part files in a single storage system 108, further exacerbating the bottleneck effect of multiple local computers 104 or host computers 102 attempting to access, and edit, the data in the data storage system 108 simultaneously.

Figure 3:
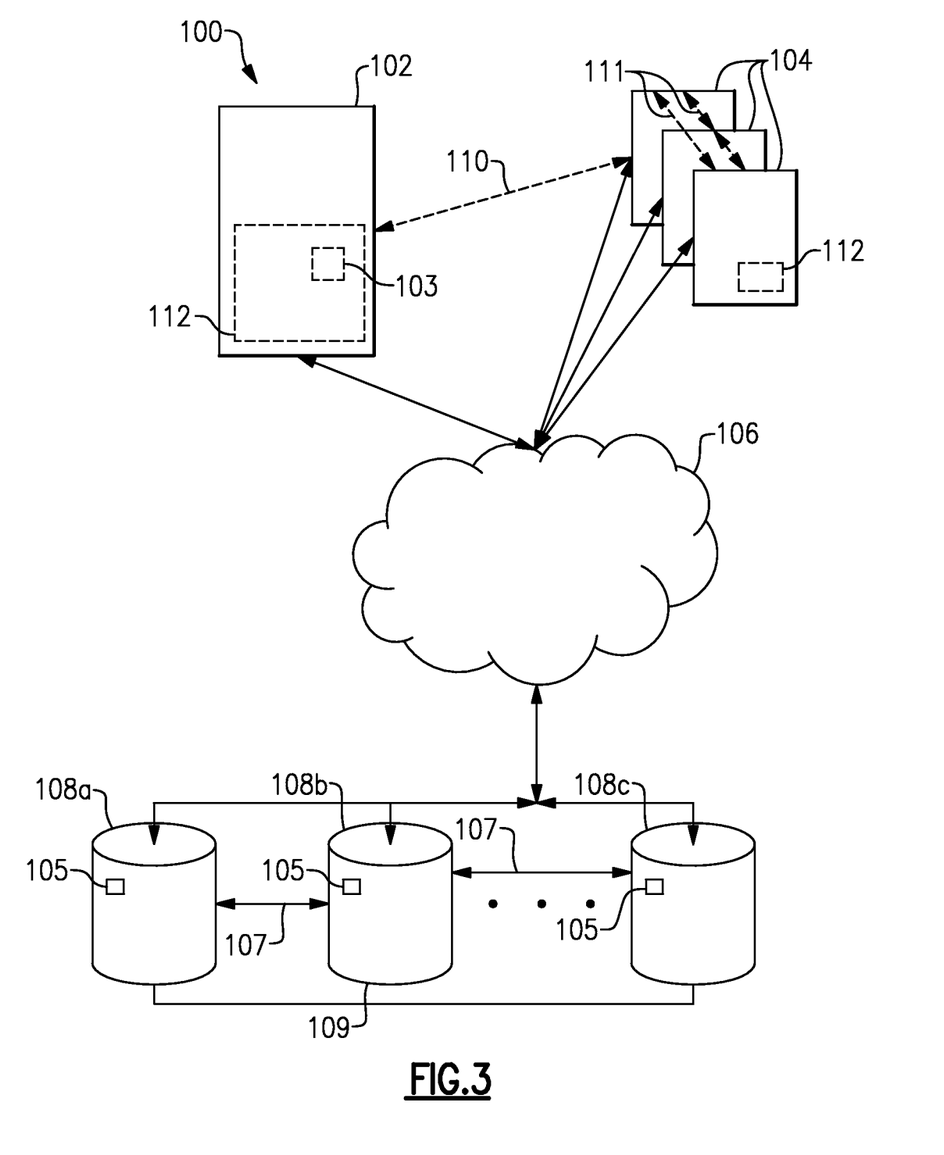
FIG. 3 illustrates an embodiment of the system for a multi-user CAx environment of FIG. 1, with the inclusion of a load balancing system.

FIG. 3 illustrates an embodiment of the multi-user CAx system 100 of FIG. 1, with the inclusion of load balancing features. The exemplary multi-user CAx system 100 of FIG. 3 utilizes multiple discrete data storage systems 108a, 108b, 108c and a load balancing module 103 to reduce the negative impact of multiple simultaneous attempts to access the data storage elements 108a, 108b, 108c. Each of the data storage systems 108a, 108b, 108c is connected to, and in communication with, the host computer 102 and the local computers 104 through the network 106, as in the embodiment of FIG. 1. Each of the storage systems 108a, 108b, 108c is also connected to, and in communication with, each other of the storage systems 108a, 108b, 108c via data communication lines 107. In alternate embodiments, the storage systems 108a, 108b, 108c can be connected to each other through the network 106 rather than the illustrated physical connections 107. In some embodiments, each of the storage systems 108a, 108b, 108c includes a processor 105 configured to control the storage system 108a, 108b, 108c. In alternative embodiments, the storage systems 108a, 108b, 108c can be controlled by one or more of the local computers 104 and the host computer 102 over the network 106.

Each of the data storage systems 108a, 108b, 108c stores a copy of the complete part file that is being operated on with the multi-user CAx environment 112. When a local computer 104 begins editing the part file, the local computer 104 is assigned to one of the storage systems 108a, 108b, 108c and stores the edits in the corresponding storage system 108a, 108b, 108c. In embodiments including the storage system based processors 105, the storage systems 108a, 108b, 108c cooperate with the host computer 102 to determine the assigned storage system 108a, 108b, 108c. In embodiments omitting the storage system processor 105, the host computer 102 controls the storage systems 108a, 108b, 108c and determines the appropriate storage system 108a, 108b, 108c to assign.

In alternative embodiments, the particular storage system 108a, 108b, 108c assigned to the local computer 104 is controlled by a hardware/software combination. In one non-limiting embodiment, the host computer 102 assigns the storage system 108a, 108b, 108c with the least amount of incoming data, or lowest processing load, to the local computer 104, thereby distributing the load from multiple simultaneous edits between the multiple storage systems 108a, 108b, 108c and increasing the speed at which the edits can be processed by the storage systems 108a, 108b, 108c. In alternative embodiments, the particular storage system 108a, 108b, 108c assigned can be determined by the assigning entity based on any other criteria.

When there is a lull in activity, i.e. minimal or no edits are being sent to the storage systems 108a, 108b, 108c from the host computer 102 or the local computers 104, the storage systems 108a, 108b, 108c synchronize the stored data, and propagates any edits received at a specific storage system 108a, 108b, 108c to each of the other storage systems 108a, 108b, 108c through the data communication lines 107 or through the network 106. As the storage systems 108a, 108b, 108c are assigned to the local computers 104 by the host computer 102, the host computer 102 can track where the edits are being made, and can force a synchronization between the storage systems 108a, 108b, 108c if the storage systems have accepted a number of edits that exceed a user or administrator defined number of edits.

In some alternate embodiments, the storage systems 108a, 108b, 108c can be forced to synchronize their stored data in response to a triggering event. By way of example, the triggering event can be a synchronization command issued from a user at one of the local computers 104, a set period of time elapsing since the previous synchronization, and a number of edits occurring. In some embodiments, the number of edits is a measured number of edits affecting or affected by a dependency within the part file.

Figure 4:
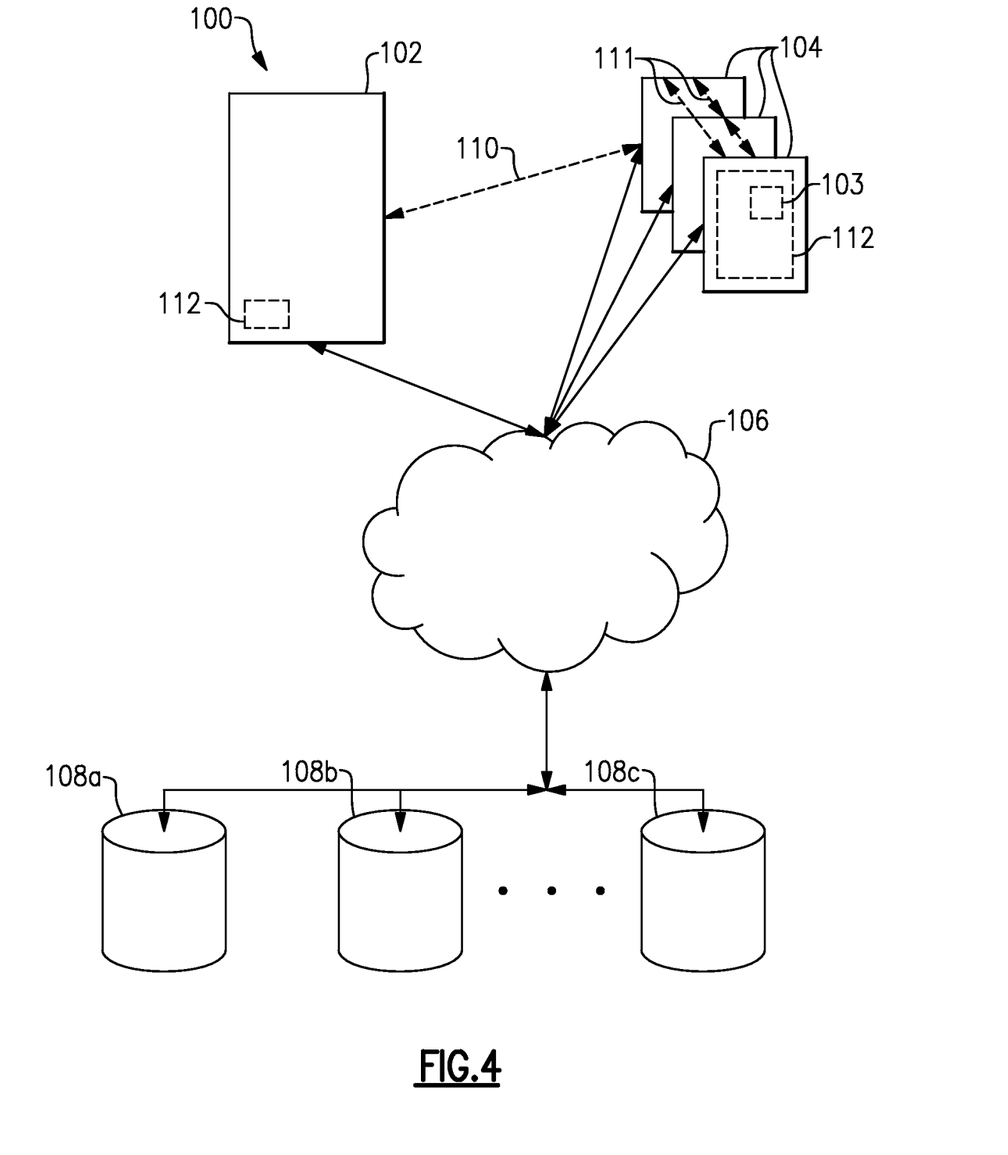
FIG. 4 illustrates an alternate embodiment of the system for a multi-user CAx environment of FIG. 1, with the inclusion of a load balancing system.

With continued reference to FIGS. 1 and 3, FIG. 4 illustrates an alternate embodiment of the CAx system 100 including the load balancing features. In the alternate embodiment, each of the storage systems 108a, 108b, 108c stores select portions of the part file such that the entire part file is not stored at any single storage system 108a, 108b, 108c. In some embodiments there is no overlap in the data stored between the data storage systems 108a, 108b, 108c. In the alternate embodiment, the host computer 102 determines which storage system 108a, 108b, 108c contains the appropriate portion of the part file for any given edit made by a local computer 104 using the load balancing module 103 within the CAx environment 112. In some examples (FIG. 3) the load balancing module 103 is stored with the multi-user CAx environment 112 on the host computer 102, in other embodiments (FIG. 4) the load balancing module 103 is stored in the CAx environments 112 of the local computers 104. The load balancing module 103 assigns the local computer 104 to the storage system 108a, 108b, 108c containing the corresponding portion of the part file. In the example data storage arrangement of FIG. 4, synchronization between the storage systems is not required, and the data communication lines 107 can be omitted.

While the distributed load system is described above with regards to multiple discrete physical storage systems 108a, 108b, 108c, it is understood that the storage systems 108a, 108b, 108c can be virtually integrated into a single physical storage system 108 (as illustrated in FIG. 1) utilizing a multi-threaded database, or multiple software databases executing within virtual servers running on a single physical computer. The multi-threaded database and virtual server embodiments functions in a similar manner to the system of FIG. 3.

With continued reference to FIGS. 1, 3 and 4, FIG. 5 illustrates a flowchart showing a method 200 for providing load balancing to the data storage elements 108a, 108b, 108c in a multi-user CAx system 100.

Figure 5:
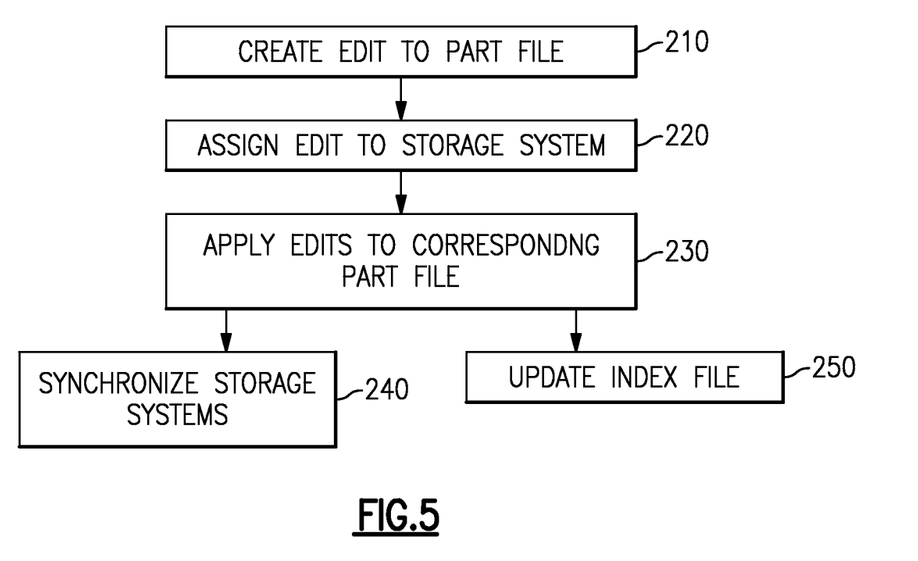
FIG. 5 is a flowchart depicting a method for operating the system of FIGS. 3 and 4.

Initially, one or more users at a local computer 104 create an edit to the part file using a tool within the CAx environment 112 at block 210. As described above, the edit can be the result of a design tool that creates multiple edits in rapid succession, or can occur simultaneously with other edits originating from other users at one or more of the other local computers 104.

Once the edit, or edits, is created, processors 105 in the storage systems 108a, 108b, 108c, or a load balancing module 103 in the CAx environment 112 of the host computer 102 or the local computers 104 assigns the edits to one of the storage systems 108a, 108b, 108c at bock 220. The edit, or edits, are then written to the data file within the assigned storage system 108a, 108b, 108c at block 230.

In one embodiment, when a triggering event occurs, each of the data storage systems 108a, 108b, 108c are synchronized at block 240, ensuring that all the edits saved to any given storage system 108a, 108b, 108c are propagated across all the storage systems 108a, 108b, 108c. In some embodiments, the triggering event is a set time period elapsing since the previous synchronization. In an alternate embodiment, the triggering event is a total number of edits exceeding an edit counter or a number of edits at a given storage system exceeding an edit counter. In another alternate embodiment, the triggering event is a total number of edits to part file features including dependencies on other part file features. In yet further alternate embodiments, two or more of the above described triggers can be utilized in conjunction with each other to force synchronization on the occurrence of multiple triggers. Once synchronized, the data stored within the part file on each of the storage systems 108a, 108b, 108c is identical to the data stored within the part file on each other of the storage systems 108a, 108b, 108c.

In an alternate embodiment, the processors 105 or CAx environment 112 determines which storage system 108a, 108b, 108c to assign the edit to at block 220 based on what aspect or feature of the part file is being edited. In this embodiment, an index file is created and stored at one or more of the data storage systems 108a, 108b, 108c and the host computer 102. The index file identifies the location of each aspect or feature of the part file, allowing for the CAx environment 112 to retrieve information as needed. Further, in this embodiment once the edits have been assigned to the corresponding part file at block 230, the index file is updated with any necessary indexing information updates at block 250. This embodiment does not require synchronization as each data storage system 108a, 108b, 108c is configured to store a different portion of the part file.

In yet a further embodiment, each of the two above embodiments, with multiple identical part files and with a single distributed part file can be combined into an embodiment utilizing multiple distributed identical partial part files. In yet a further embodiment additional data storage systems can be utilized beyond the illustrated three data storage systems 108a, 108b, 108c with minimal modification to the CAx system 100.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for multi-user design comprising:
a host computer including a memory and a processor, wherein the host computer is configured to operate a multi-user CAx environment including a part file;
a plurality of local computers in communication with the host computer, each of the local computers including a local CAx environment portion of the multi-user CAx environment;
a plurality of data storage systems in communication with said host computer, wherein each of the data storage systems includes at least a portion of the part file, each of the data storage systems being distinct from the plurality of local computers; and
a load balancing module within said CAx environment wherein the load balancing module is configured to cause the host computer to assign edits originating at one of the local computers to one of said plurality of data storage systems;
wherein the load balancing module is configured to cause the multi-user CAx environment to assign edits originating from a first local computer to a first data storage system and edits from at least one second local computer to a second data storage system.

2. The system of claim 1, wherein the load balancing module is further configured to cause each of said plurality of data storage systems to synchronize with each other of said data storage systems in response to a triggering condition.

3. The system of claim 2, wherein the triggering condition is an elapsed time since a previous synchronization.

4. The system of claim 2, wherein the triggering condition is an amount of edits stored to at least one data storage system in said plurality of data storage systems.

5. The system of claim 4, wherein the amount of edits stored to at least one data storage system is an amount of edits to a feature of the part file including a dependency.

6. The system of claim 1, wherein each of the data storage systems stores a complete copy of the part file.

7. The system of claim 1, wherein each of the data storage systems stores a partial copy of the part file.

8. The system of claim 7, further comprising an index file stored in at least one of said host computer and said plurality of data storage systems, wherein the index file includes an index correlating each partial copy of the part file with one or more corresponding data storage devices.

9. The system of claim 7, wherein each partial copy of the part file is fully distinct from each other partial copy.

10. The system of claim 8, wherein at least two of the partial copies include shared information.

11. The system of claim 1, wherein each of the data storage systems is connected to each of the other data storage systems via a physical connection.

12. The system of claim 1, wherein each of the data storage systems is connected to each of the other data storage systems via a network connection.

13. A method for load balancing in a multi-user CAx environment comprising:
   assigning at least one data storage element in a plurality of data storage elements to each local computer of a plurality of local computers in a multi-user CAx environment such that said local computers are distributed across said plurality of data storage elements, wherein each of the data storage elements is distinct from each of the local computers; and
   applying at least one edit originating from one of said local computers to an at least partial part file stored in said at least one data storage element assigned to the local computer, thereby distributing an application of edits to said part file across said plurality of data storage elements.

14. The method of claim 13, further comprising synchronizing each of said data storage elements in said plurality of data storage elements with each other of said data storage elements in said plurality of data storage elements.

15. The method of claim 13, wherein synchronizing data storage elements comprises propagating edits to a part file received by at least one of said data storage elements to each other of said data storage elements.

16. The method of claim 13, wherein synchronizing each of said data storage elements in said plurality of data storage elements with each other of said data storage elements in said plurality of data storage elements is performed in response to a triggering event.

17. The method of claim 16, wherein said triggering event includes at least one of an elapsed time since a previous synchronization and a number of edits to the part file exceeding a predefined edit count.

18. The method of claim 13, further comprising creating an index file correlating each data storage element in said plurality of data storage elements with a portion of a complete part file, such that each data storage element stores a distinct partial part file, and such that a combination of all partial part files forms the complete part file.

* * * * *